Patented Apr. 20, 1954

2,676,134

UNITED STATES PATENT OFFICE 2,676,134

THERAPEUTIC COMPOSITION OF NEOMYCIN AND BACITRACIN

Oscar Felsenfeld, Chicago, Ill., assignor to Commercial Solvents Corporation, Terre Haute, Ind., a corporation of Maryland No Drawing. Application April 27, 1951,
Serial No. 223,452

2 Claims. (Cl. 167—65)

My invention relates to therapeutic compositions and more particularly it relates to a therapeutic composition containing as its essential active ingredients the antibiotics neomycin and bacitracin.

Neomycin is produced by a soil organism of the Streptomyces group similar to *Streptomyces fradiae* when grown in nutrient media. The antibiotic was first reported by Waksman and Le Chevalier in March, 1949 (Science, vol. 109, page 305). Neomycin is active against many Gram-positive and Gram-negative bacteria and is a thermostable, basic compound which is soluble in water.

Bacitracin is produced by the organism *Bacillus subtilis* (Tracy 1), when propagated in various liquid nutrient media. This antibiotic was first reported by Johnson, Ankar and Meleney in 1945 (Science, volume 102, page 376). Bacitracin is a neutral, water-soluble, relatively thermostable substance which resists digestion by pepsin or trypsin and is stable in acid solution. It is variously believed that the antibiotic has the structure of a polypeptide although this has not been conclusively shown.

The two antibiotics described above are active against a variety of microorganisms. In many cases both antibiotics are active against the same microorganisms while in others one or the other alone is active. Against some microorganisms, large quantities of a particular antibiotic are required in order to inhibit further growth of the microorganism. Such is the case when neomycin is employed against the organism *Lactobacillus arabinosis* and when bacitracin is used against the organism *Neisseria catarrhalis* or the same *Lactobacillus arabinosis*. Large quantities of neomycin or bacitracin are also required in the treatment of the disease Amebiasis which is caused by the protozoan parasite *Endamoeba histolytica* which disease is becoming increasingly prevalent.

I have now discovered that a mixture of neomycin and bacitracin produces a synergistic action upon a great many microorganisms, the two antibiotics acting cooperatively such that the total effect of the mixture of antibiotics upon the microorganism being treated is greater than the sum of the effects of each of the antibiotics taken independently. Thus when a combination of the two antibiotics is used the total amount of the two required against a particular microorganism is less than the amount of either neomycin or bacitracin which is required if only one of the antibiotics is employed. This results in much more economical treatment and in many cases greatly improved results since the combination of the two antibiotics will often accomplish what one of the antibiotics alone could not do.

The two antibiotics of my new therapeutic composition can be combined in any suitable manner. For example they can be combined in aqueous solution or in any other inert injectable vehicle. They can be combined in tablet form for oral administration or merely mixed together in any manner.

The following examples will illustrate the synergism resulting from the combination of neomycin and bacitracin as the essential ingredients in my new therapeutic composition. As used in the examples the neomycin unit may be defined as being that amount of the antibiotic which will completely inhibit the growth of *Escherichia coli* ATTC No. 9637 in one ml. of nutrient agar. Similarly the bacitracin unit may be defined as being that amount of the antibiotic which when diluted 1 to 1,024 in a series of two-fold dilutions in 2 ml. of beef infusion broth, completely inhibits the growth of a stock-strain (Chanin) of group A hemolytic Streptococcus when the inoculum used to seed the tubes is 0.1 ml. of a $10^{-2}$ dilution of an overnight culture in blood broth.

EXAMPLE I

The following table shows the synergistic action of a therapeutic composition containing neomycin and bacitracin when the therapeutic composition is employed against the organism *Endamoeba histolytica* which causes amebiasis. The table shows the amount of neomycin, the amount of bacitracin, and the amount of the two antibiotics in combination which is required to cause at least 80% inhibition of the organism *Endamoeba histolytica* in laboratory test mice. The synergism is apparent since if the effect of the combination of neomycin and bacitracin was additive then the amount of neomycin and bacitracin required would be about 2,850 and 3,000 units per kilogram of body weight respectively.

Table I

| Antibiotic | Amount in Units per Kilogram of Body Weight |
|---|---|
| Neomycin alone | 5,700 |
| Bacitracin alone | 6,000 |
| Neomycin and Bacitracin | 3,000 / 1,500 |
| Neomycin and Bacitracin | 1,500 / 3,000 |
| Neomycin and Bacitracin | 4,000 / 500 |

EXAMPLE II

The following table shows the synergistic action of neomycin and bacitracin in combination against various strains of β-hemolytic streptococci. The table shows the number of units per ml. required to inhibit the microorganism in vitro and the number of units per mouse required to inhibit the microorganism in vivo. The synergism is apparent since in every case considerably less of the antibiotics are required when used in combination than when employed alone.

*Table II*

| Strain of β-Hemolytic Streptococci | Neomycin Alone | | Bacitracin Alone | | Neomycin+Bacitracin | |
|---|---|---|---|---|---|---|
| | In Vitro, units/ml. | In Vivo, units/mouse | In Vitro, units/ml. | In Vivo, units/mouse | In Vitro,[1] units/ml. | In Vivo,[1] units/mouse |
| 211 | 50 | 1,000 | 1 | 3 | 10/.25 | 25/1 |
| 255 | 5 | 15 | 0.5 | 1 | 2.5/.25 | 10/0.5 |
| 325 | 1 | 2.5 | 0.25 | 1 | 0.5/0.1 | 1/.25 |
| 714 | 5 | 25 | 1 | 2 | 2.5/0.5 | 10/0.5 |
| 857 | 20 | 25 | 0.25 | 2 | 10/0.1 | 10/1 |
| 929 | 2 | 20 | 1 | 5 | 1/0.5 | 10/2 |
| 950 | 10 | 100 | 2 | 5 | 2/0.5 | 25/1 |

[1] Data given as units of neomycin/units of bacitracin.

EXAMPLE III

The following table shows the synergistic action of the combination of the antibiotics neomycin and bacitracin in vitro against the organism *Endamoeba histolytica*. The table shows the percent of complete inhibition actually obtained and the percent inhibition that would have been obtained if the effectiveness of the two antibiotics had been merely additive.

*Table III*

| Test | Neomycin, units/ml. | Bacitracin, units/ml. | Inhibition, Percent | |
|---|---|---|---|---|
| | | | Found | Calculated[1] |
| 1 | 0 | 0 | 0 | 0 |
| 2 | 0 | 100 | 100 | 100 |
| 3 | 5 | 5 | 0 | 11.6 |
| 4 | 10 | 10 | 44.4 | 23.3 |
| 5 | 10 | 50 | 72.2 | 63.3 |
| 6 | 25 | 25 | 90 | 55 |
| 7 | 25 | 50 | 95 | 80 |
| 8 | 50 | 10 | 90 | 76.6 |
| 9 | 50 | 25 | 98 | 91.6 |
| 10 | 75 | 0 | 100 | 100 |

[1] Refers to inhibition that would have been obtained if effect of combination of two antibiotics had been additive.

EXAMPLE IV

The following table shows the results of in vitro studies on the synergistic action of neomycin and bacitracin against some of the bacteria commonly found in the mouth and throat.

*Table IV*

| Test Organism | Inhibitory Concentration in Units/ml. | | | |
|---|---|---|---|---|
| | Bacitracin Alone | Neomycin Alone | Bacitracin + | Neomycin |
| *Gaffkya tetragena* | 0.2 | 1.0 | 0.1 | 0.1 |
| *Lactobacillus arabinosis* | 25 | 25 | 0.5 | 1 |
| *Lactobacillus delbrueckii* | 10 | 25 | 1 | 10 |
| *Lactobacillus fermenti* | 0.5 | 5 | 0.05 | 1 |

EXAMPLE V

In 33 non-amoebic dysentery cases in infants, the patients were given a combination of 10,000 units of neomycin and 2,000 units of bacitracin orally four times per day for about 5 days (until diarrhea ceases). All of the patients recovered. When bacitracin alone is used in non-amoebic type dysentery in infants the average cure is 34 out of 50 and when neomycin alone is used the average cure is 41 out of 50, the uncured cases resulting in death.

The above specific examples show that my neomycin-bacitracin combination is effective and produces more-than-additive results over the range of relative proportions of from about 100 units neomycin:1 unit bacitracin to 1 unit neomycin:5 units bacitracin.

It is to be understood that my invention is not to be limited to the specific embodiment set forth in the above examples since various modifications will naturally occur to those skilled in the art. I intend for all equivalents within the scope of this specification and the attached claims to be specifically included herein.

I claim:

1. A therapeutic composition comprising in combination neomycin and bacitracin in the relative proportions of from about 100 units neomycin:1 unit bacitracin to 1 unit neomycin:5 units bacitracin.

2. The composition of claim 1 dispersed in an aqeous medium.

References Cited in the file of this patent

UNITED STATES PATENTS

| Number | Name | Date |
|---|---|---|
| 2,544,630 | Hegarty | Mar. 6, 1951 |

OTHER REFERENCES

J. A. M. A., vol. 142, No. 9, Mar. 4, 1950, page 653.

Physicians Bull., July to Aug., 1950, vol. XV, No. 4, page 123, "Neomycin."

Molitor et al., "Pharacology and Toxicology of Antibiotics," J. Pharm. and Exptl. Therap., Apr. 1950, vol. 98, pgs. 1 to 49, at pages 43 to 49.

J. A. Ph. A., "Aureotracin," vol. XXXIX, Sept. 1950, pgs. 483 to 485.

Drug and Cosmetic Ind. (D. and C. I.), Mar. 1950, pgs. 327 and 328, "Bacitracin in Aerosol Form."

J. Pharm. and Pharmacol., "Streptomycin-Bacitracin-Polymyxin Combination," Mar. 1951, page 191.

Drug Trade News, Mar. 19, 1951, page 38, "Bacitracin and Tyrothricin Ointment."